United States Patent [19]

Asakawa et al.

[11] Patent Number: 5,548,736
[45] Date of Patent: Aug. 20, 1996

[54] METHOD AND APPARATUS OVERCOMING DELAY INTRODUCED BY INSTRUCTION INTERLOCKING IN PIPELINED INSTRUCTION EXECUTION

[75] Inventors: Takeo Asakawa; Aiichiro Inoue, both of Kawasaki, Japan

[73] Assignee: Fujitsu Limited, Kawasaki, Japan

[21] Appl. No.: 364,384

[22] Filed: Dec. 23, 1994

Related U.S. Application Data

[63] Continuation of Ser. No. 261,236, Jun. 14, 1994, abandoned, which is a continuation of Ser. No. 851,557, Mar. 13, 1992, abandoned.

[30] Foreign Application Priority Data

Mar. 14, 1991 [JP] Japan .................................. 3-049730

[51] Int. Cl.$^6$ .............................. G06F 9/30; G06F 9/46
[52] U.S. Cl. ...................... 395/375; 395/733; 364/DIG. 1
[58] Field of Search ...................................... 395/375, 733

[56] References Cited

U.S. PATENT DOCUMENTS

| 3,949,379 | 4/1976 | Ball ........................................... 395/775 |
| 4,656,578 | 4/1987 | Chilinski et al. ......................... 395/375 |
| 4,736,288 | 4/1988 | Shintani et al. .......................... 395/375 |
| 4,750,112 | 6/1988 | Jones et al. .............................. 395/375 |
| 4,782,441 | 11/1988 | Inagami et al. .......................... 395/800 |
| 4,903,196 | 2/1990 | Pomerene et al. ....................... 395/375 |
| 4,926,323 | 5/1990 | Baror et al. ............................. 395/375 |
| 4,942,525 | 7/1990 | Shintani et al. .......................... 395/375 |
| 4,965,724 | 10/1990 | Utsumi et al. ........................... 395/700 |
| 4,970,641 | 11/1990 | Hester et al. ........................... 395/733 |
| 5,202,967 | 4/1993 | Matsuzaki ............................... 395/375 |
| 5,212,779 | 5/1993 | Saito ...................................... 395/800 |
| 5,222,240 | 6/1993 | Patel ...................................... 395/775 |

FOREIGN PATENT DOCUMENTS

| 0171595 | 2/1986 | European Pat. Off. . |
| 0399757 | 11/1990 | European Pat. Off. . |
| 59-2143 | 6/1984 | Japan . |
| 1-134530 | 5/1989 | Japan . |
| 2-69825 | 3/1990 | Japan . |

OTHER PUBLICATIONS

Smith et al, "Implementing Precise Interrupts in Pipelined Processors", IEEE, vol. 37, No. 5, May 1988, pp. 562–573.
"Programmable DSP Architecture", Lee, IEEE ASSP Magazine vol. 6, Iss 1, pp. 4–14, Jan. 1989.
"CPC—An Architecture Suited for Josephson and Pipelined Memory Machines", Shimizu et al., IEEE Compt, vol. 38, No. 6, Jun. 1989, pp. 825–832.
"Performance Comparison of Load/Store and Symetric Instruction Set Architectures" Alpert et al, IEEE Compt, pp. 172–181, May 1990.
"A Strategy for Avoiding Pipeline Interlock Delays in a Microprocessor", Yoshida et al, IEEE Compt., pp. 14–19, Sep. 1990.
Abraham et al., "Instruction Reorganization for a Variable-Length Pipelined Microprocessor", *IEEE International Conference on Computer Design: VLSI in Computers & Processors*, pp. 96–101, Oct. 1988.
"Roll–Back Interrupt Method for Out–of –Order Execution of System Programs", *IBM Technical Disclosure Bulletin*, vol. 32, No. 5A, Oct. 1989.
"Pipeline Processor Exception Control Mechanism", *IBM Technical Disclosure Bulletin*, vol. 24, No. 11A, Apr. 1982.

*Primary Examiner*—Parshotam S. Lall
*Assistant Examiner*—Viet Vu
*Attorney, Agent, or Firm*—Staas & Halsey

[57] ABSTRACT

A pipeline operation control method and system in which, in the execution of successive first and second instructions, to avoid a pipeline disturbance, the second instruction is shifted from a calculating state to a special state as a final state that does not conflict with the final state of the first instruction when the first instruction has two or more calculating states immediately before the final state, and when the special state can be inserted as the final state of the second instruction and the calculating state of the second instruction is carried out within a single machine cycle, whereby the final state of the first instruction and the special state of the second instruction are carried out at the same time.

3 Claims, 17 Drawing Sheets

METHOD AND APPARATUS OVERCOMING DELAY INTRODUCED BY INSTRUCTION INTERLOCKING IN PIPELINED INSTRUCTION EXECUTION

This application is a continuation of application Ser. No. 08/261,236, filed Jun. 14, 1994, now abandoned, which is a continuation of application number 07/7851,557, filed Mar. 13, 1992, now abandoned.

BACKGROUND OF THE INVENTION

1. Field of the Invention

The present invention relates to a pipeline operation control method and system, and more particularly relates to a pipeline operation control method and system for preventing a pipeline disturbance so as to speed up the execution of pipeline instructions.

2. Description of the Related Art

In a pipeline process (i.e., the processing of one instruction), one instruction process is divided into a plurality of successive processing states, and plural instructions are executed in parallel formation.

When at least two of the successive processing states in a first instruction are the same, these states are called interlocked states. In the interlocked states, the same hardware is used. Therefore, with respect to a second instruction to be executed in parallel with the first instruction, the state of the second instruction which is to be processed at the same time when the interlocked states of the first instruction are to be processed must be different from the interlocked states of the first instruction in order to prevent the attempt to use the same hardware in processing, at the same time the respective states of the first instruction and the second instruction. Because of this, as later described in more detail with reference to the drawings, conventionally, the processing of the instructions following the first instruction is delayed. This delay is called a pipeline disturbance.

As a result, conventionally, when there are inter locked states in one instruction, instructions following the first instruction are necessarily delayed.

SUMMARY OF THE INVENTION

The present invention is provided in view of the above problem, and has an object to provide a pipeline operation control system and method in which the processing time is made short and without delay despite the occurrence of a pipeline disturbance.

To attain the above object, there is provided, according to the present invention, a pipeline operation control method for executing a plurality of instructions by a pipeline process. Each of the instructions has a sequence of a plurality of states including a final state and at least one calculating state immediately before the final state. In pipeline processing of first and second instructions, each having plural successive states, the method comprises the steps of: a first step for determining whether or not the first instruction has two or more calculating states immediately before the final state; a second step for determining whether or not a special state, which does not conflict with the final state of the first instruction, can be inserted as the final state of the second instruction, and whether or not the calculating state of the second instruction is carried out within a single machine cycle; and shifting the process of the second instruction from the calculating state to the special state as the final state, when the first step determines that the first instruction has two or more calculating states immediately before the final state, and when the second step determines that the special state can be inserted as the final state of the second instruction and that the calculating state of the second instruction is carried out within a single machine cycle, whereby the final state of the first instruction and the special state of the second instruction are carried out at the same time.

According to an aspect of the present invention, after the execution of the first and the second instructions simultaneously, the method further comprising the step of storing information necessary to complete the execution of the first and the second instructions, and to control the order of the sequence of the instructions following the first and the second instructions.

The information necessary to complete the execution of the first and the second instructions, and to control the order of the sequence of the instructions following the first and the second instructions is the location of the instruction that has caused the interrupt and the cause of the interrupt.

When an interrupt is generated immediately after completion of the execution of the first instruction, the information necessary to complete the execution of the first and the second instructions, and to control the order of the sequence of the instructions following the first and the second instructions is information necessary for continuing the pipeline process after execution of the first instruction.

After the execution of the first and the second instructions, when an interrupt is not generated immediately after completion of the execution of the first instruction, the information necessary to complete the execution of the first and the second instructions, and to control the order of the sequence of the instructions following the first and the second instructions is the information necessary for continuing the pipeline process after the execution of the second instruction.

The information necessary to designate a location of an interrupt is information concerning the cause of a program interrupt.

The information concerning the cause of a program interrupt is an access exception detected in an operand access of an instruction.

Alternatively, the information concerning the cause of a program interrupt is information for designating a program event record detected during the execution of the first or the second instruction.

Still alternatively, the information concerning the cause of a program interrupt is control data necessary to cause a program interrupt.

The information necessary to complete the execution of the first and the second instructions, and to control the order of the sequence of the instructions following the first and the second instructions is the address of an instruction that caused an interrupt, the address being stored in a PSW address register.

According to another aspect of the present invention, there is provided a pipeline operation control system for executing a plurality of instructions by a pipeline process as described above. The system comprises a program status word instruction address register for storing an address of the second instruction after the execution of the second instruction unless an interrupt is generated after the execution of the first instruction, and for storing an address of the first instruction when an interrupt is generated after the execution of the first instruction.

The system further comprises a first register for storing an instruction length code of the first instruction when the first instruction has at least two calculating states immediately before the final state, or for storing an instruction length code of the second instruction when the second instruction does not have the special state, a second register for storing an instruction length of the second instruction only when the second instruction has the special state, a first adding unit for adding the contents in the first register and the contents in the second register, a selecting unit for selecting the output of the first register only when the second instruction does not have the special state, and for selecting the output of the adding unit only when the second instruction has the special state; and a second adding unit for adding the output of the selecting unit and the output of the program status word instruction address register.

The selecting unit has an inhibiting function for inhibiting the selection of the output of the adding unit when an interrupt is detected in the execution of the first instruction.

The system further comprises a program interrupt code register for storing the cause of an interrupt.

The system further comprises a first interrupt content storing register, a second interrupt content storing register, a register output selector for selecting the contents in the first interrupt content storing register or the contents in the second interrupt storing register to be input to the program interrupt code register, the first interrupt content storing register registering the contents of an interrupt of the first instruction when the first instruction has at least two calculating states immediately before the final state or registering the contents of an interrupt of the second instruction when the second instruction does not have the special state, and the second interrupt content storing register registering the contents of an interrupt of the second instruction only when the second instruction has the special state, the register output selector selecting the output of the second interrupt content storing register unless the first interrupt content storing register stores the contents of the interrupt of the second instruction.

BRIEF DESCRIPTION OF THE DRAWINGS

The above object and features of the present invention will be more apparent from the following description of the preferred embodiments with reference to the drawings, wherein.

DESCRIPTION OF THE PREFERRED EMBODIMENTS

For better understanding of the present invention, conventional techniques are first described.

Figure 1:
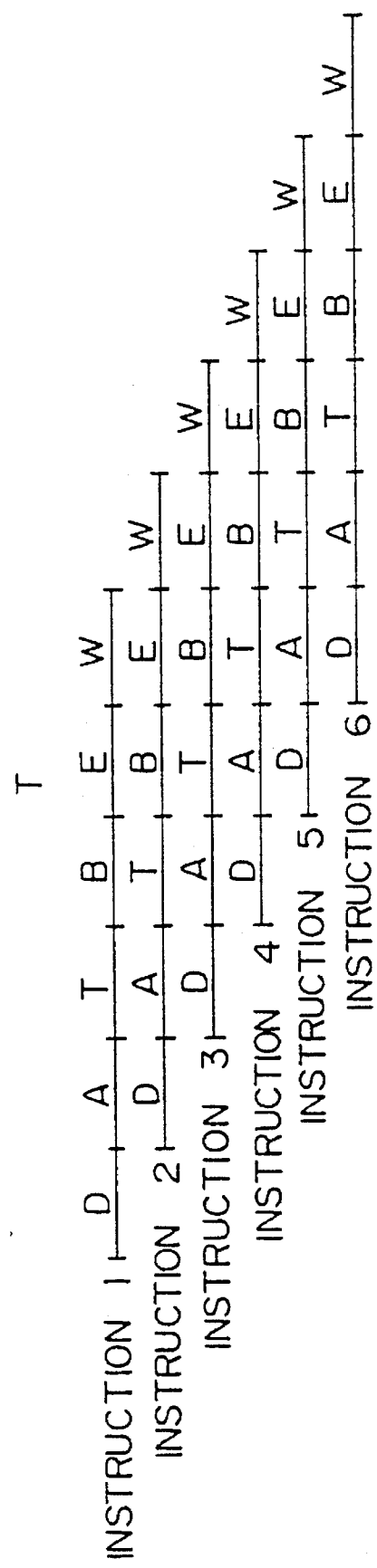
FIG. 1 is a diagram showing a conventional example of a pipeline process.

FIG. 1 shows an example of a conventional pipeline operation control. In the figure, each instruction has six states D, A, T, B, E, and W in this example. The processing of one instruction is completed by sequentially processing these states.

In the D state, the instruction is decoded; in the A state, the operand address or the target instruction address of the decoded instruction is calculated; in the T state, a search in a TLB (Translation Lookaside Buffer) is carried out to provide an address for accessing a cache memory; in the B state, the cache (or buffer) is read; in the E state, an arithmetic operation is carried out; and in the W state, the result of the arithmetic operation is stored in a register.

First, an instruction 1 is started, and when the instruction 1 enters the state A, the D state of the instruction 2 is started simultaneously. Further, when the instruction 2 enters the state A, the D state of the instruction 3 is started simultaneously. This follows in a similar way so that a plurality of instructions (in the figure, up to the instruction 6) are executed in parallel and sequentially, or successively.

Thus, a plurality of instructions are executed in parallel to each other. This execution is similar to a flow of pipelines. Therefore, the operation is referred to as a pipeline operation.

When the state of the instruction enters the state A, the state of the next instruction 2 enters the state D. When the state of the instruction 2 enters the state A, the state of the next instruction 3 enters the state D. Thus, by using the same hardware, a pipeline operation is executed sequentially and in parallel. To be able to carry out such a pipeline operation, it is necessary not to set the same states of plural instructions at the same time. For example, with respect to a time T shown in FIG. 1, the instruction 1 is in the E state, the instruction 2 is in the B state, the instruction 3 is in the T state, the instruction 4 is in the A state, and the instruction 5 is in the D state. Therefore, at the same time, the same states do not overlaps, or co-exist. This is important because each of the same states uses the same hardware. If one tried to process the same states of two instructions at the same time, the hardware would even conflict.

The information, such as an operand code used in each state of each instruction is stored in a register called a pipeline tag. The pipeline tags are implemented by a shift register. In accordance with the development of the pipeline process, the contents in the pipeline tag of each instruction are shifted to the adjacent tag. The time necessary for processing one state is called one machine cycle. When the pipeline process is ideally completed, N instructions are seen to be executed within N machine cycles so that the process is executed at a high speed.

Figure 2:
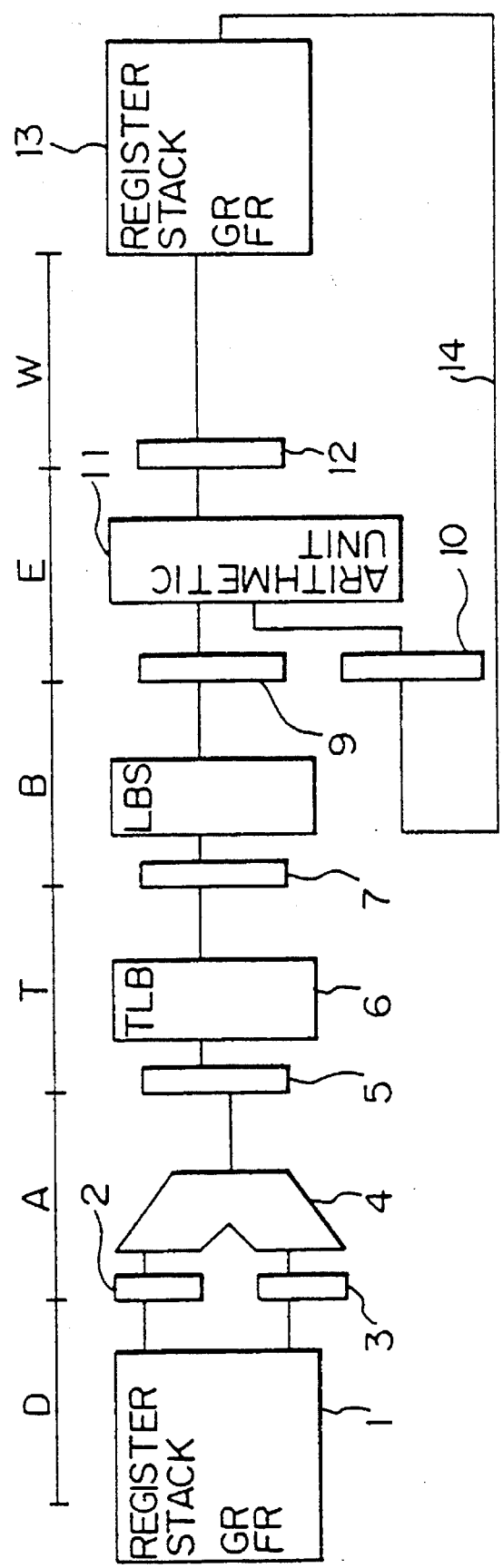
FIG. 2 is a block diagram showing an example of a conventional pipeline system.

FIG. 2 is a block diagram showing an example of a conventional pipeline system for executing one instruction. In the figure, the hardware constructions are shown to correspond to respective states. In the D state, an operand code in the instruction is decoded to obtain a base register number B and an index register number X in the operand. By the obtained base register number B and the index register number X, a register stack 1 (including a general purpose register GR and a floating point register FR) is accessed to read out address calculating data which are then set in a base register 2 and an index register 3.

In the next state A, the outputs of the registers 2 and 3 are added by an adder 4, and the result is set as a valid address in a register 5. In the T state, the valid address set in the register 5 is input to a TLB (Translation Lookaside Buffer) 6. The transformed real address from the TLB 6 is set in a register 7.

In the next state B, the real address set in the register 7 is read and input as an address to a LBS 8 (Local Buffer Storage) for storing a copy of part of main storage data so as to enable high speed accessing), and corresponding data is read from the LBS 8 and set in a register 9.

In the next state E, an arithmetic operation on the contents of the register 9 is executed by an arithmetic operation unit 11, and the result of the arithmetic operation is set in a register 12. In the next state W, the result data of the arithmetic operation read from the register 12 is written in a register stack 13.

In the next instruction, the contents of the register stack 13 may be set in the B state in a register 10 through a register operand bus 14, and may be sent to the calculating unit 11 in the state E of the next instruction.

In the data processing unit for carrying out a pipeline process, as a factor which prevents an ideal operation of pipeline processing, there are pipeline interlocks. As a typical example of a pipeline interlocks, there is an E state interlock in which a calculation operation is not finished within one cycle. For example, in a floating-point instruction, a fraction alignment operation requires one cycle and an adding operation requires one cycle so that a total of two cycles are required. Accordingly, it is impossible to execute such an instruction as the floating-point instruction within one cycle.

Figure 3:
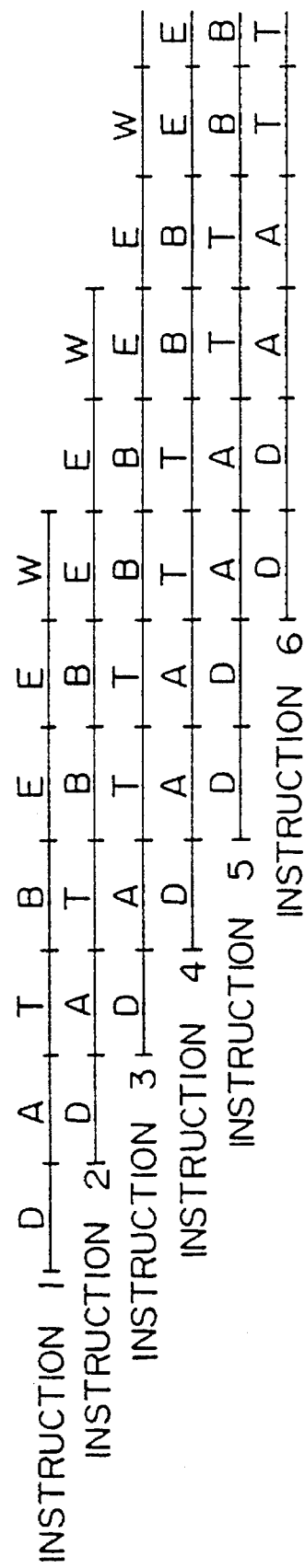
FIG. 3 is a diagram for explaining a pipeline interlock in a conventional pipeline system.

FIG. 3 is an explanatory diagram of a pipeline interlock. In the figure, assume that the E state in each of the instructions 1 to 6 requires two cycles. Therefore, the E state in the instruction 1 requires two cycles so that the B state in the next instruction 2 cannot be shifted to the E state at the time of the second E state of the instruction 1 in order to avoid the hardware conflict, resulting in the B state in the instruction 2 using two cycles. Therefore, even though the instruction 1 is finished in seven cycles, at and after the instruction 2, the length of each instruction is sequentially increased by one cycle. As a result, the D state in the instruction 5 requires two cycles. Thus, the start of the instruction 6 is delayed by one cycle in comparison with the case of FIG. 1. The reason for this is that the influence of the fact that the E state in the instruction 1 requires two cycles extends to the instruction 5 so that the D state requires two cycles.

Figure 4:
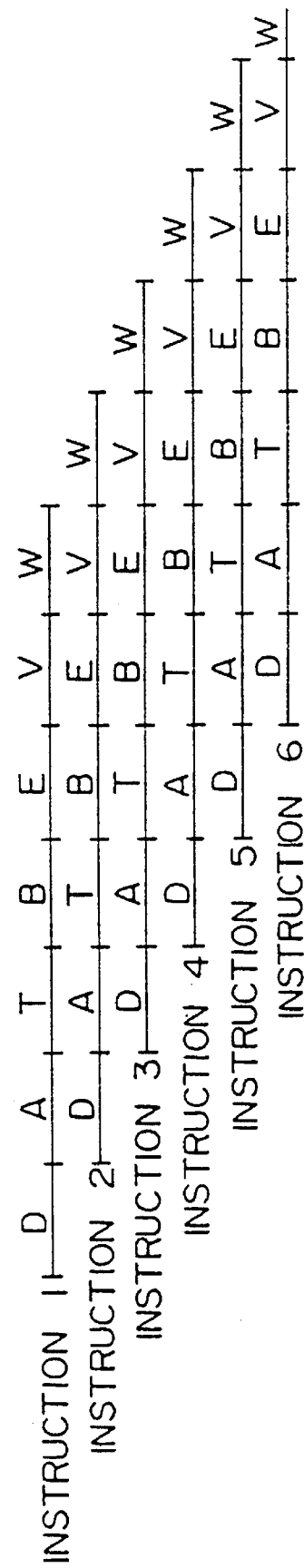
FIG. 4 is a diagram showing an improvement of a conventional pipeline process.

FIG. 4 is a diagram of another conventional method of an improved pipeline process. To eliminate the inconvenience as described with reference to FIG. 3, the method shown in FIG. 4 makes the E state, that is an arithmetic operation state, into a pipeline so as to divide it into an E state and a V state. Namely, in FIG. 4, each of the interlocked E states in all instructions as shown in FIG. 3 is divided into the E state and the V state to carry out a pipeline process. In this case, the W state in one instruction does not conflict with the V state in the next instruction so that a smooth processing similar to the process shown in FIG. 1 becomes possible so that the D state in each instruction is sequentially executed in a one cycle delay.

When an instruction with a V state and an instruction without a V state are executed sequentially and in parallel, however, the instructions are also delayed.

Figure 5:
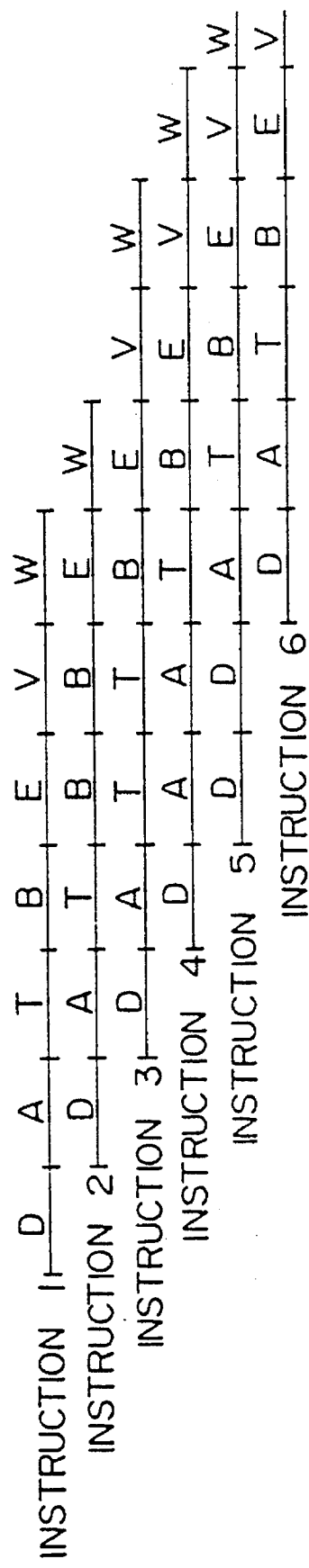
FIG. 5 is an explanatory diagram of a problem in the conventional system.

FIG. 5 is a diagram explaining the problem in the conventional method shown in FIG. 4. Assume that the instruction 1 is with a V state, the instruction 2 is without a V state, and the instructions at and after the instruction 3 each have V states. In the conventional art, the processing of all of the instructions must be finished at the W states. Therefore, if the instruction 2 does not have the V state, the instruction 2 must be interlocked before the preceding instruction 1 enters the W state in order to prevent the second instruction 2 going beyond the W state of the preceding instruction 1. Generally, during the E state, an arithmetic unit is driven with a fixed clock signal; by contrast, during the B state, the arithmetic unit is not yet operated but data is read from a chache or an operand is read from a register and the read data or the operand is sent to the arithmetic unit. Therefore, the B state can freely be interlocked. Because of this reason, the instruction 2 is interlocked by using the two cycles of the B state. Thus, during the periods when the instruction 1 is executing the E state and the V state, the instruction 2 must be kept in the B state. During the two cycles of the B states in the instruction 2, the states of the following instructions cannot be shifted to the next state so that each instruction is kept in the previous state for two cycles.

As a result, the instruction 5 is kept in the D state for two cycles, and the instruction 6 enters the D state after the D state of the instruction 5 is finished. As a result, a delay of one cycle is generated between the instruction 5 and the instruction The present invention removes the above-described problems in the conventional methods.

Figure 6A:
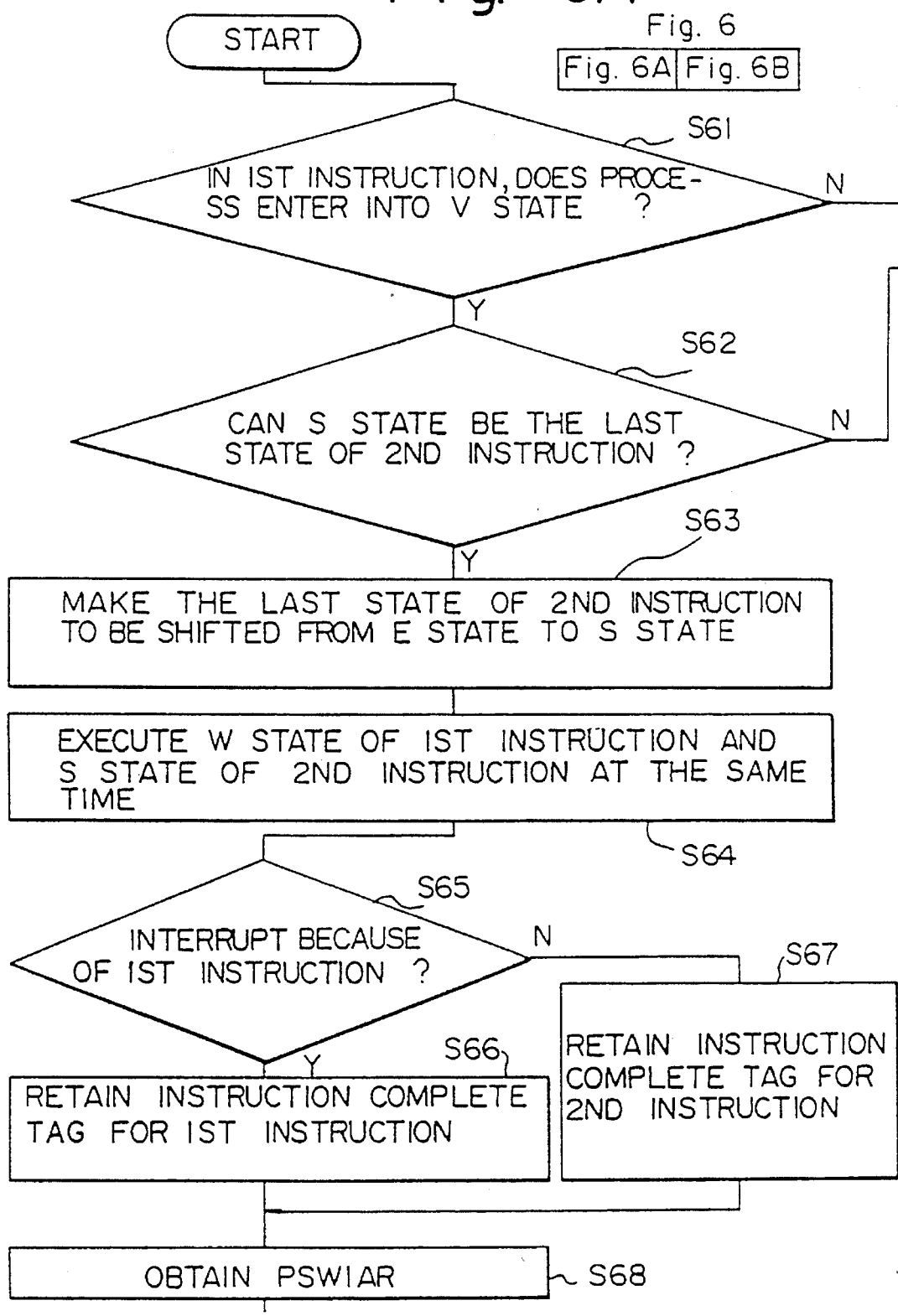
FIGS. 6A and 6B are a flowchart explaining the operation of a pipeline operation control method according to an embodiment of the present invention.
Figure 6B:
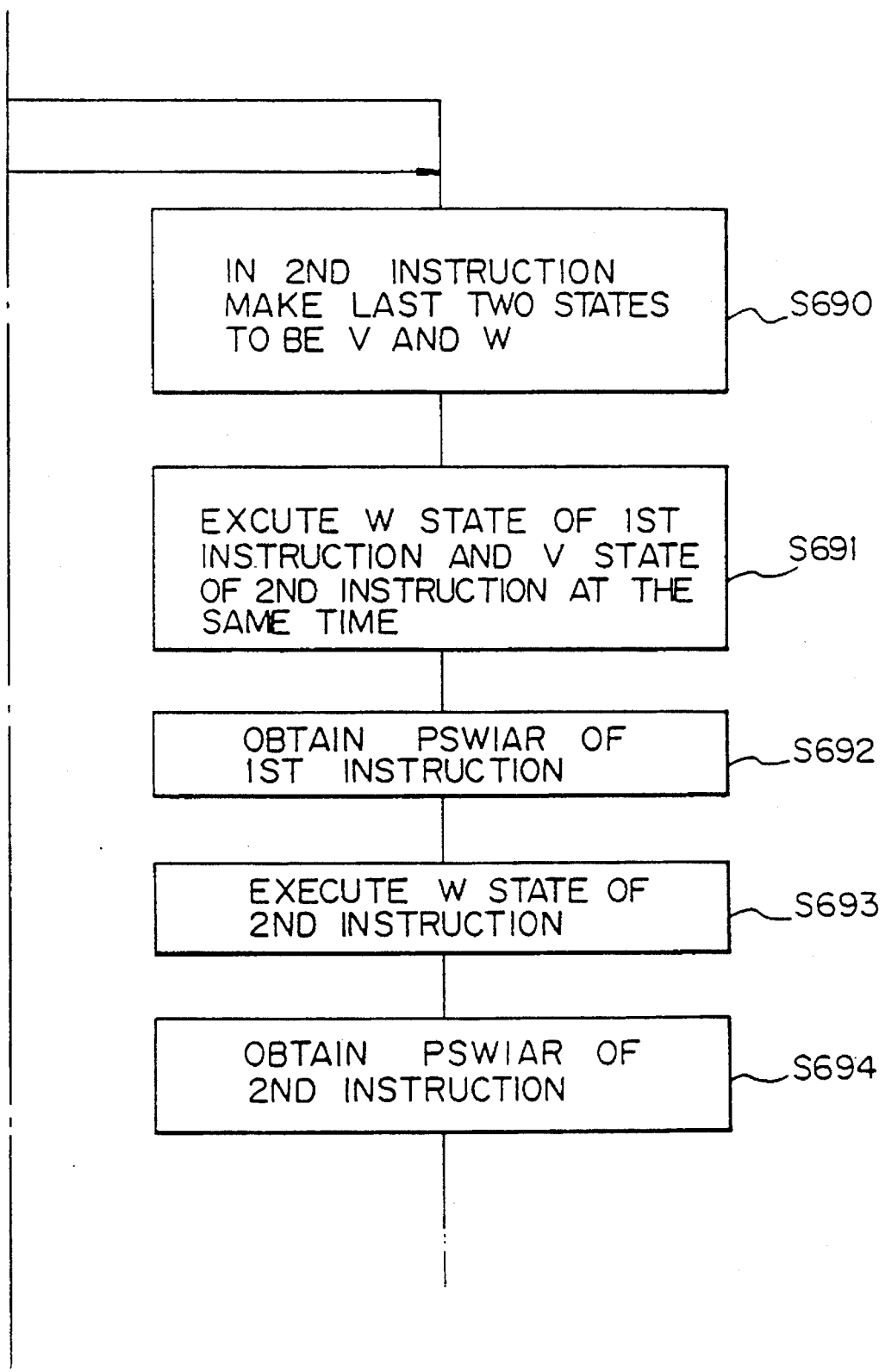

FIGS. 6A and 6B are a flowchart explaining the operation of a pipeline operation control method according to an embodiment of the present invention.

In FIG. 6A, at step S61, during the process of the first instruction, it is determined whether or not the process of the first instruction enters from the E state to the V state. If so, at step S 62, it is determined whether or not a special state S, which does not conflict with the W state in the first state, can be inserted as the last state of the second instruction. If it is possible, at step S 63, the last state of the second instruction is shifted from the E state to the S state. Then, at step S64, the W state of the first instruction and the S state of the second instruction are executed at the same time. Then, at step S65, it is determined whether or not an interrupt is generated because of the execution of the first instruction. If it is yes, then at step S66, the instruction complete tag for the first instruction is retained. Here, the instruction complete tag is an instruction length code (ILC) and an exception valid code XV. If the interrupt is not generated by the first instruction, then at step S67 the instruction complete tag for the second instruction is retained. Then, at step S68, the contents of the program status word instruction address register (PSWIAR) are obtained from the instruction complete tag for the first or the second instruction.

At step S61 or S62, if the answer is no, then from steps S690 to S694 as shown in FIG. 6B, the conventional pipeline process as shown in FIG. 4 or FIG. 5 is carried out. Namely, at step S690, the last two states of the second instruction are made to be the V state and the W state; at step S691, the W state of the first instruction and the V state of the second instruction are executed at the same time; at step S692, the contents of the PSWIAR of the first instruction are obtained; at step S693, the W state of the second instruction is executed; and at step S694, the contents of the PSWIAR of the second instruction are obtained.

According to the embodiment of the present invention, when the special state S can be set in the second instruction so that the first and the second instructions are completed at the same time, the second instruction and those after the second instruction are not delayed so that the process can be carried out at a high speed.

The S state is the final state of the second instruction for finishing a pipeline processing of the second instruction when the second instruction can be shifted into the S state.

Figure 7:
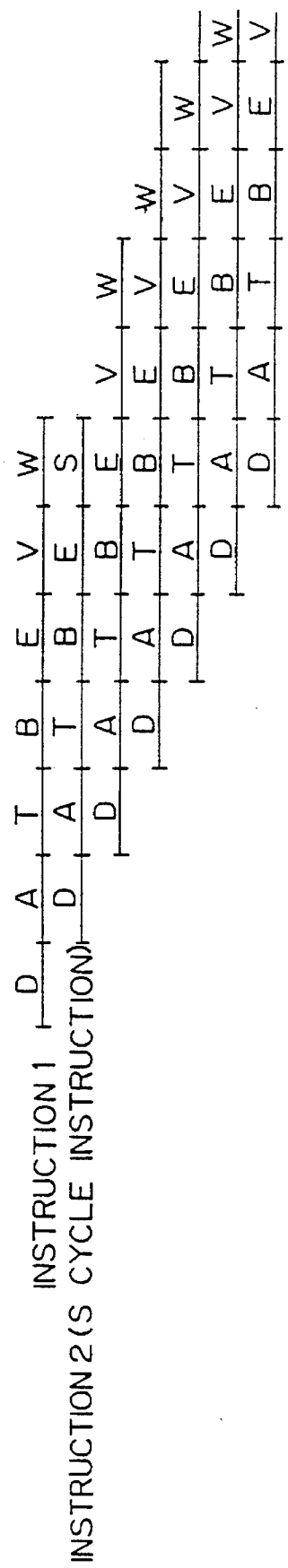
FIG. 7 is a diagram showing the shift of the states in the pipeline operation control method according to an embodiment of the present invention.

FIG. 7 is a diagram explaining a pipeline operation according to an embodiment of the present invention. In the figure, the second instruction 2, which is referred to as an S cycle instruction, follows the instruction 1. In the last two states of the S cycle instruction, the pipeline processing state is shifted from the E state to the S state. In other words, the S cycle instruction does not include the V state after the E state. Therefore, the pipeline finishing process, i.e., the W state, of the instruction 1 immediately before the S cycle instruction 2 and the S state of the S cycle instruction 2 are carried out simultaneously. Note that the S state is selected in such a way that it does not conflict with the W state of the first instruction. Namely, the hardware used in the W state of the first instruction is different from the hardware used in the S state of the second instruction. Further, the E state in the S cycle instruction is selected in such a way that it does not conflict with the V state of the first instruction. As a result, the B state in the S cycle instruction 2 is processed within a single cycle, and thus, the D state of each instruction is not forced to wait so that the time is shorter by one cycle in comparison with the conventional case shown in FIG. 5. In FIG. 7, at the timing of the W state of the instruction 1, pipeline finishing processes of two instructions are carried out simultaneously by the information of the W state of the instruction 1 and the information of the S state of the S cycle instruction.

Figure 8:
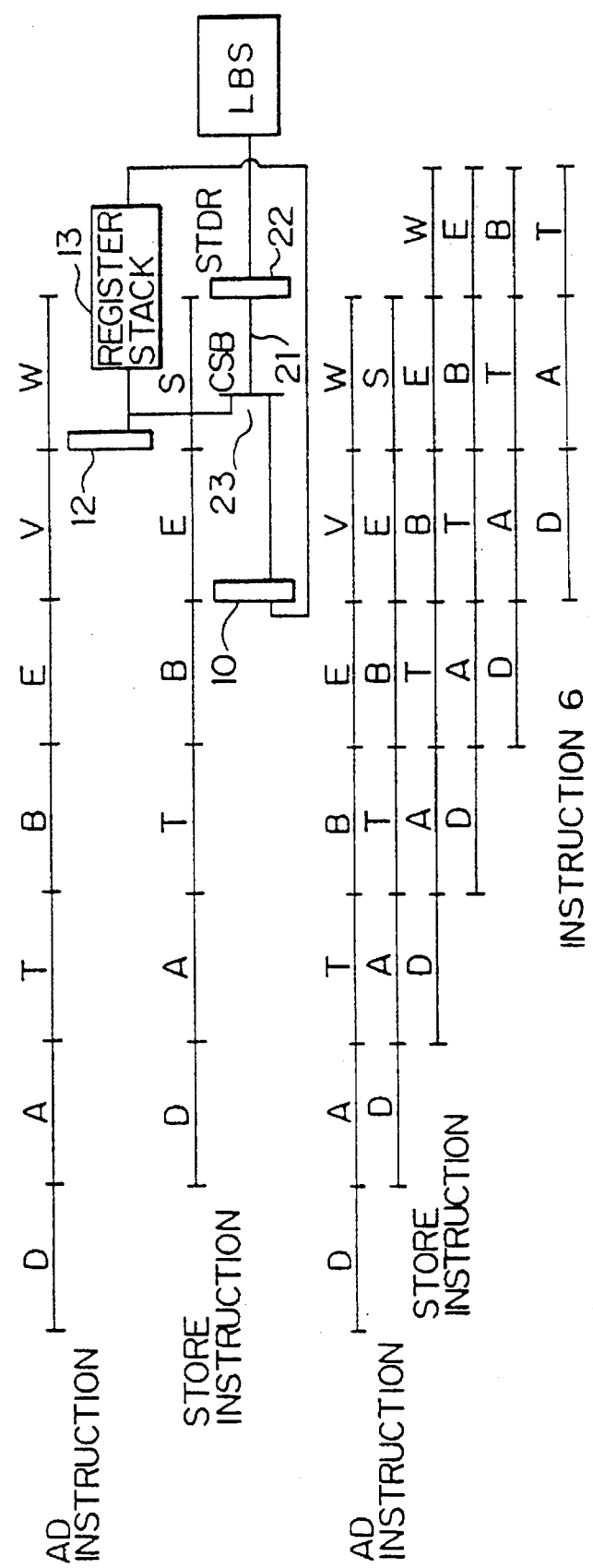
FIG. 8 is a diagram explaining the operation of a pipeline operation of a floating point adding instruction and a store instruction when there is a special state, according to an embodiment of the present invention.

FIG. 8 is a diagram explaining the operation of a pipeline operation of a floating point adding instruction (AD) and a store instruction when there is a special state, according to an embodiment of the present invention. In FIG. 8, the store instruction includes the S state as its final state.

When the result of the floating point adding instruction (AD) is not used in the store instruction, the result of a previously executed instruction, which is different from the floating point adding instruction (AD), is stored by the store instruction. Namely, the contents in a register 13, which have been stored in accordance with the previously executed instruction other than the floating point adding instruction AD, are read at the B state in the store instruction and set in a register 10, and the selector 23 selects the output of the register 10 so that the contents of the register 10 are set, through a selector 23 and a cache storage bus (CSB) 21 in a store data register (STDR) 22.

By contrast, when the result of the floating point adding instruction is to be stored by the store instruction, the selector 23 selects the output of the register 12, in which the contents of the calculation effected during the E state of the AD instruction are stored, and the contents in the register 12 are stored through the selector 23 and the CSB 21, in the store data register (STDR) 22. Note that the storing operation into the store data register (STDR) 22 is carried out immediately in the S state.

As a result, when the result of the AD instruction is to be stored, the data in the register 12 is set through the selector 23 to the STDR 22. As a result, the W state of the AD instruction and the S state of the store instruction are completed at the same time. Since the B state in the store instruction is only one cycle, there is no delay of two cycles at the start of the instruction 6. In FIG. 8, the next instruction followed by the store instruction is an instruction without a V state. Therefore, since the store instruction does not have the state B over the two cycles, there is no time loss in the third instruction and those after the third instruction.

It should be noted, however, that the S state is not always inserted in the instruction, but it is also possible to execute an instruction without the S state.

Figure 9:
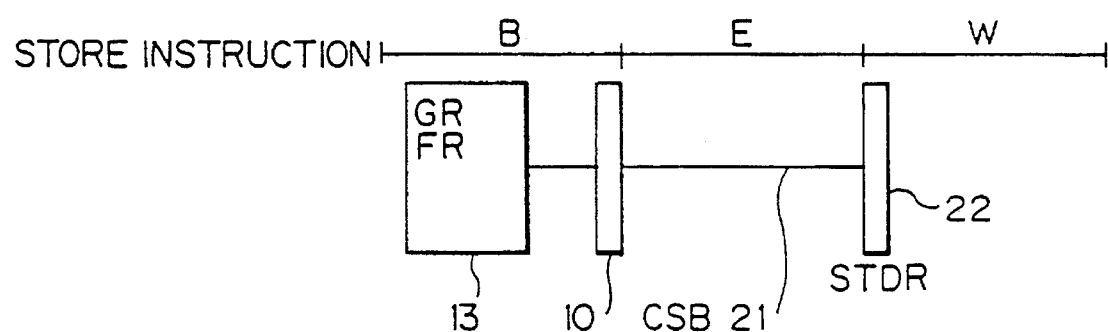
FIG. 9 is a diagram explaining the operation of a store instruction when there is not a special state, according to an embodiment of the present invention.

FIG. 9 is a diagram for explaining a store instruction when it does not include the S state in the last state according to an embodiment of the present invention. In this case, the operation is the same as the conventional store operation. Namely, the contents in a register stack 13 are read and set in the B state. The output of the register 10 is set through the CSB 21 in the store data register (STDR) 22 during the W state. Then, from the STDR 22, the data is stored in a cache or a main storage. After setting the data in the STDR 22, the pipeline process for the store instruction is completed.

Figure 10:
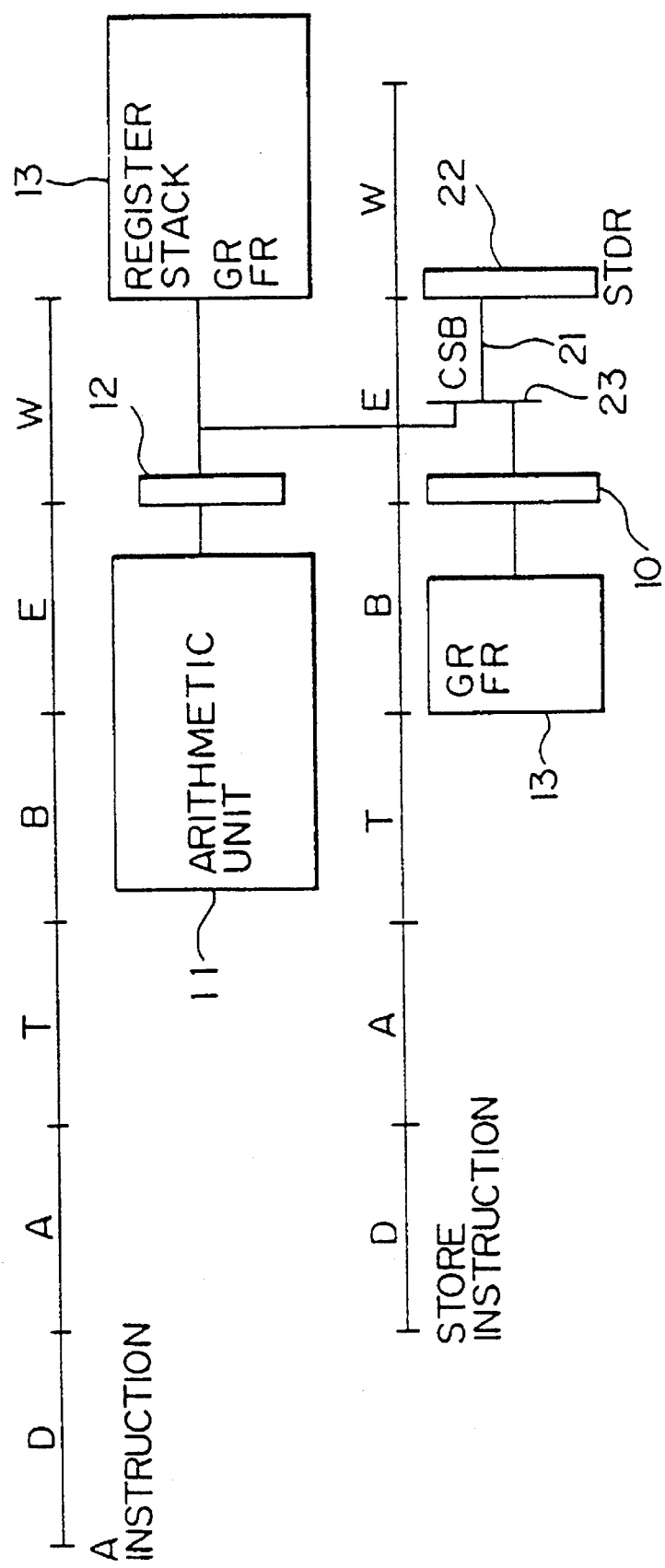
FIG. 10 is a diagram explaining the operation of a pipeline operation of an add instruction and a store instruction when there is not a special state, according to an embodiment of the present invention.

FIG. 10 is a diagram explaining the operation of an add instruction and a store instruction when the store instruction does not include the S state in the last state according to an embodiment of the present invention.

The figure shows the case in which a result of an A instruction (fixed point add instruction) is stored. In this case, the operation is the same as the conventional operation. Namely, when the add instruction and the store instruction are not related to each other, according to the add instruction, the result of the calculation in the arithmetic operation unit 11 is set in a register 12, and the contents of the register 12 are set in a register stack 13; and according to the store instruction, the data set in the register stack 13, which were previously stored by an instruction other than the above mentioned A instruction, are read during the B state from the register stack 13, and are set in the register 10. The contents of the register 10 are selected by a selector 23 during the E state in the store instruction and set in the STDR 22. By contrast, when the result of the A instruction is to be stored in the STDR 22 by the store instruction, the result of the calculation during the E state by the arithmetic operation unit 11 is set in the register 12 during the E state in the A instruction, and the contents of the register 12 are selected instead of the register 10 by the selector 23 during the E state of the store instruction to be output to the CSB 21 and set in the STDR 22 during the W state in the store instruction.

As a result, while two cycles of instructions are necessary in the sequence in which the contents of the register stack 13 are read and stored, it is possible, by directly writing the contents of the register 12 into the STDR 22, to execute the store instruction within one cycle when the E state interlock is not present in the A instruction. This is the same as in the conventional method.

Since the first instruction and the second instruction are completed at the same time as the second instruction which includes the S state at its last state, the program status word instruction address register must be designed to store the correct address of the program regardless of whether the instruction with the S state or the instruction without the S state is finished.

Figure 11:
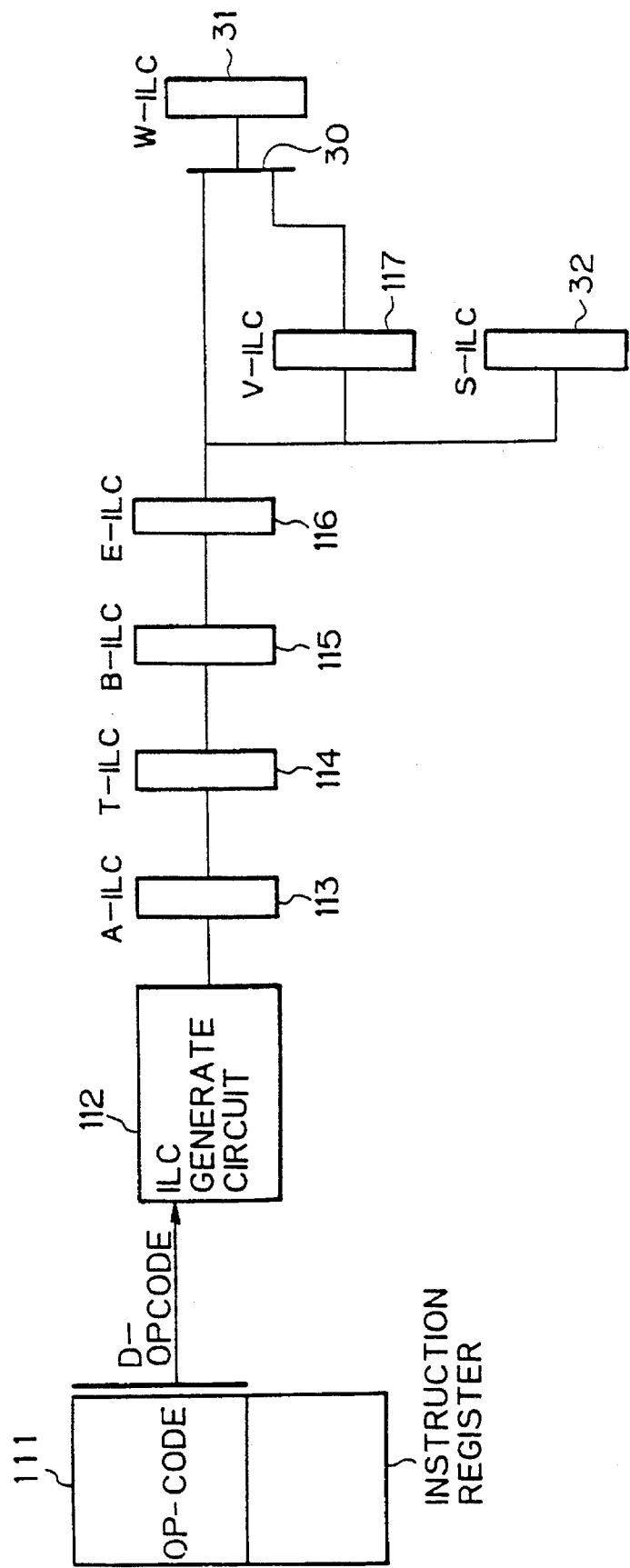
FIG. 11 is a block diagram showing tag registers used in an embodiment of the present invention.

FIG. 11 is a block diagram showing tag registers for one instruction. In the figure, during the D state, an operand code is read from an instruction register. Based on the operand code, an instruction length code ILC is generated by an ILC generating circuit 112. The instruction length code ILC is sequentially shifted in an A-ILC register 113 during the A state, a T-ILC register 114 during the T state, a B-ILC register 115 during the B state, and an E-ILC register during the E state, respectively. After the E state, when the state of the instruction is changed from the E state to the W state, a selector 30 selects, during the W state, the ILC in the E-ILC register to be stored in a W-ILC register 31; when the state is changed from the E state to the V state, the ILC is stored in a V-ILC register 117 during the V state, and the selector 30 selects the ILC in the V-ILC register 117 to be stored in the W-ILC 31 during the W state; and when the state is changed from the E state to the S state, the ILC is shifted from the E-ILC register 116 to an S-ILC register 32. These registers A-ILC, T-ILC, B-ILC, E-ILC, V-ILC, S-ILC, and W-ILC are referred to as tag registers.

Figure 12:
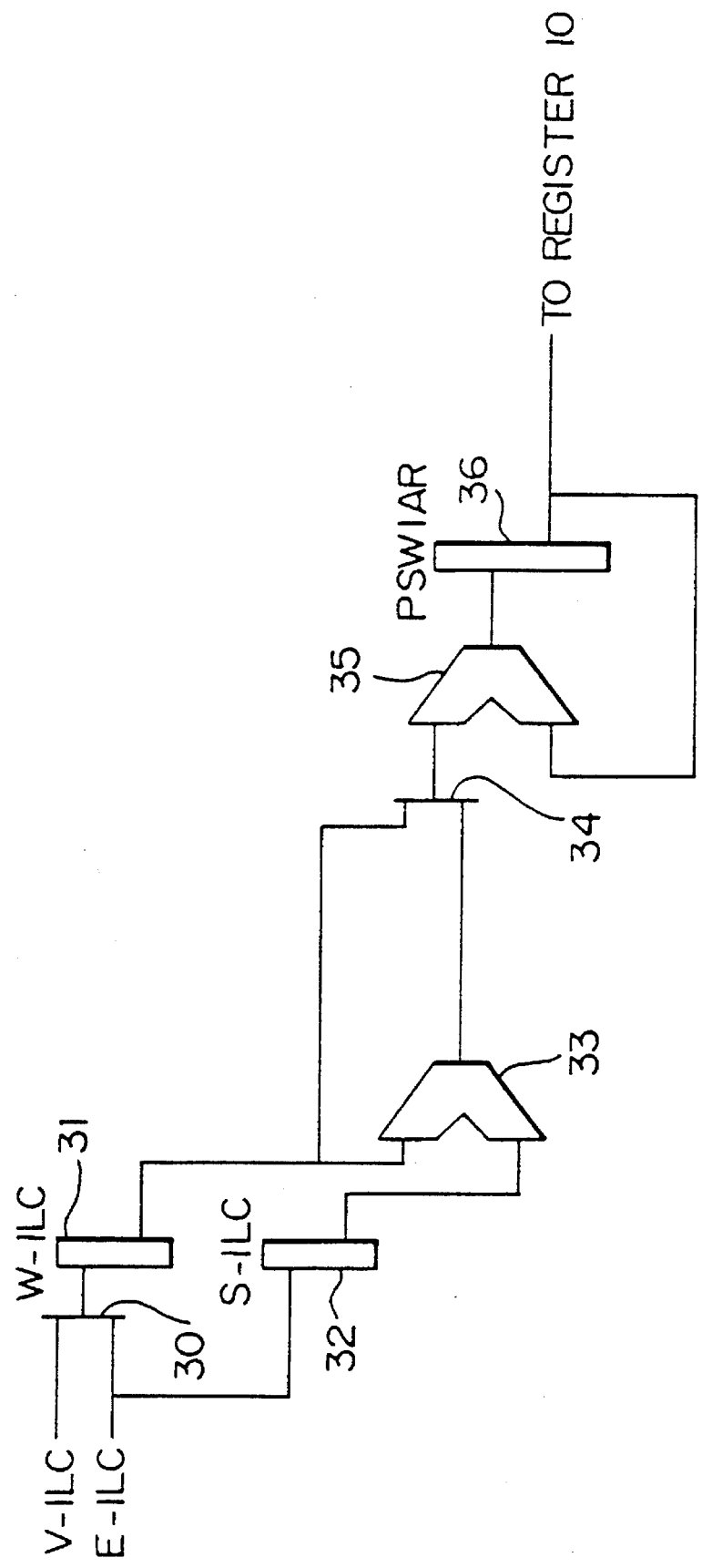
FIG. 12 is a block diagram showing an example of a PSWIAR updating circuit according to an embodiment of the present invention.

FIG. 12 is a block diagram showing a circuit for updating the program status word instruction address register (PSWIAR). In the figure, 30 is the selector, 31 is the W-ILC register or in other words a W cycle instruction length register, 32 is the S-ILC register or in other words an S cycle instruction length register, 33 is an adder, 34 is a selector, 35 is an adder, and 36 is the PSWIAR.

Each of the instruction length codes ILC is retained as a tag of the W state instruction that has the W state as its last state, i.e., a tag W-ILC, or a S state instruction which has the S state as its last state, i.e., a tag S-ILC. A W-ILC is set in the register 31 by setting a V-ILC (instruction length code of the instruction in the V state) or a E-ILC (instruction length code of the instruction in the E state) through the selector 30. On the other hand, an S-ILC is set in the register 32 by the E-ILC. Here, the V-ILC represents the instruction length code of an instruction being executed in the V state, and the E-ILC represents the instruction length code of an instruction being executed in the E state.

The adder 33 adds the W-ILC and the S-ILC. The selector 34 selects either one of the W-ILC and the output of the adder 33. The output of the selector 34 is added to the output of the PSWIAR 36 in an adder 35 to update the PSWIAR 36. The output of the PSWIAR 36 is input to the register 10 (see FIG. 8).

The PSWIAR 36 is updated in the final state of the instruction process, namely the last W state or S state. Therefore, the contents of the PSWIAR 36 represent the address of the last instruction that has been processed. When an interrupt is generated, the PAWIAR 36 is used to indicate the instruction that caused the interrupt. To this end, the contents of the PSWIAR 36 are stored from the register 10 through CSB 21 to a designated main storage area as an old PSW, and is read by an interrupt process program. The interrupt process is executed by hardware (not shown in the figure).

Here, the selecting condition in the selector 34 in particular is explained. The condition for the W-ILC to be selected by the selector 34 is when a program interrupt is detected in the W state of an instruction, namely in an instruction having the W state at its last state. The example in FIG. 7 is the case when a program interrupt is detected in the instruction 1. When the PSWIAR 36 indicates that the instruction 1 is completed, and when an interrupt is detected during the execution of the instruction 1, then the S state instruction (the store instruction in the above example) must be inhibited so as not to be executed. The inhibition of the store instruction is carried out by inhibiting the storing operation of data into the store data register (STDR) 22 in FIG. 8 and by making the selector 34 select the output of the W-ILC 31 in FIG. 11.

When an interrupt is not generated after the execution of the instruction 1, the selector 34 selects the output of the adder 33 so that the instruction length codes of two instructions, i.e., the first instruction and the second instruction, are added to the contents of the PSWIAR 36. Therefore, the PSWIAR 36 indicates that the instruction up to the S cycle instruction has been completed at that time.

Figure 13:
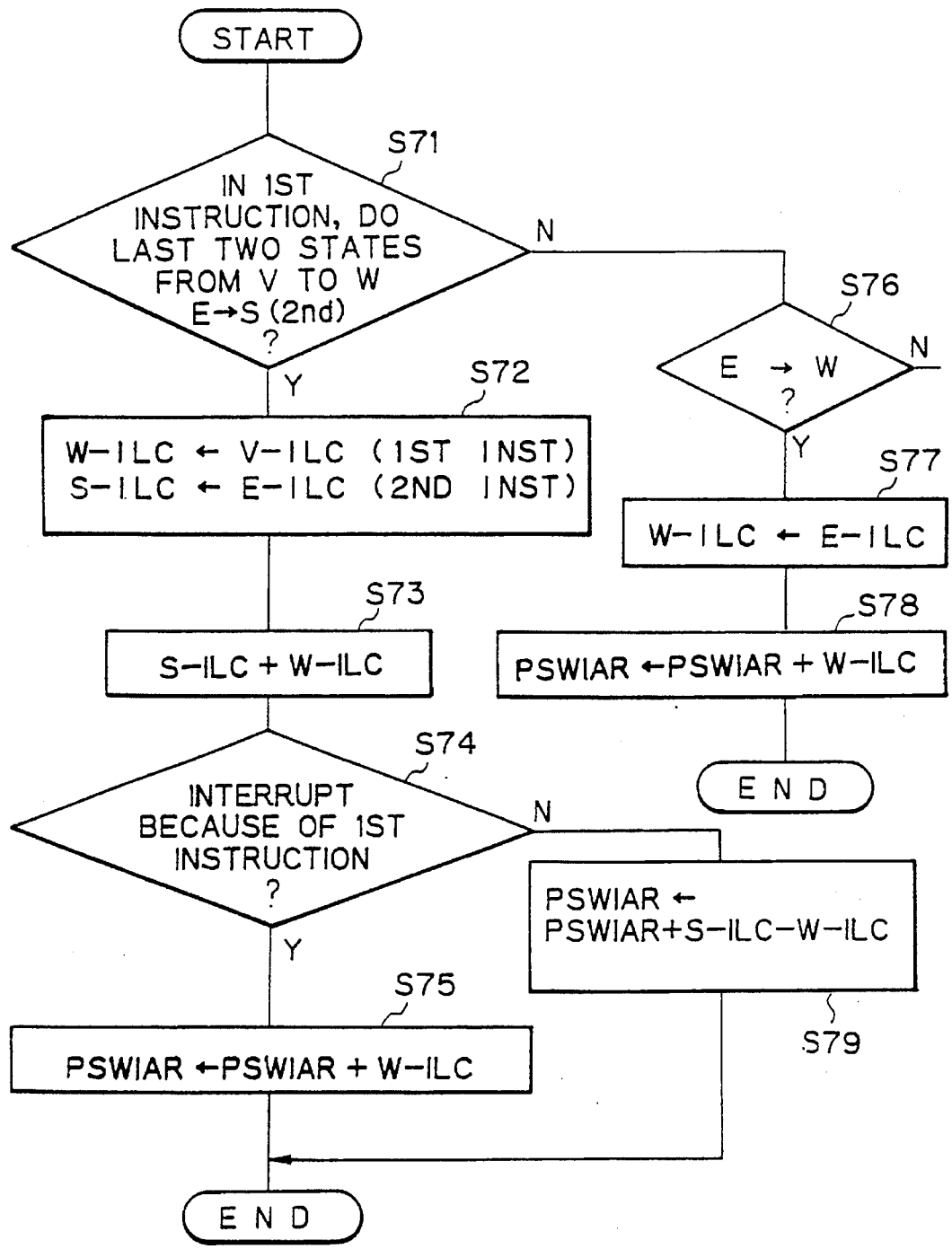
FIG. 13 is a flowchart explaining the operation of a program status word instruction address register in the pipeline operation control method according to an embodiment of the present invention.

FIG. 13 is a flowchart explaining the operation of the program status word instruction address register shown in FIG. 12 in the pipeline operation control method according to an embodiment of the present invention.

In FIG. 13, at step S71, when the last two states of the first instruction changes from the V state to the W state, or when the last two states of the second instruction change from the E state to the S state, then at step S 72, the selector 30 selects the V-ILC (the instruction length code of the instruction in the V state) of the first instruction for setting in the W-ILC 31, and the E-ILC (the instruction length code of the instruction in the E state) of the second instruction is set in the S-ILC 32. Then, at step S73, the adder 33 adds the W-ILC and the S-ILC. At step S74, it is determined whether or not the interrupt is caused because of the first instruction. If it is yes, then at step S 75, the selector 34 selects the W-ILC register 31 so that the adder 35 outputs PSWIAR+W-ILC as a new PSWIAR. At step S74, if the interruption is not caused by the first instruction, then at step S 79, the selector selects the output of the adder 33 so that the adder 35 outputs PSWIAR+S-ILC+W-ILC as a new PSWIAR.

At step S71, when the last two states of the instruction do not change from the V state to the W state, then at step S76, it is determined whether or not the last two states of the instruction change from the E state to the W state. If so, at step S77, the E-ILC is set in the W-ILC content 31. Then, at step S78, the W-ILC is added to the contents of the PSWIAR 36 and the added result is stored in the PSWIAR 36. In this case, there is no S-state instruction.

Figure 14:
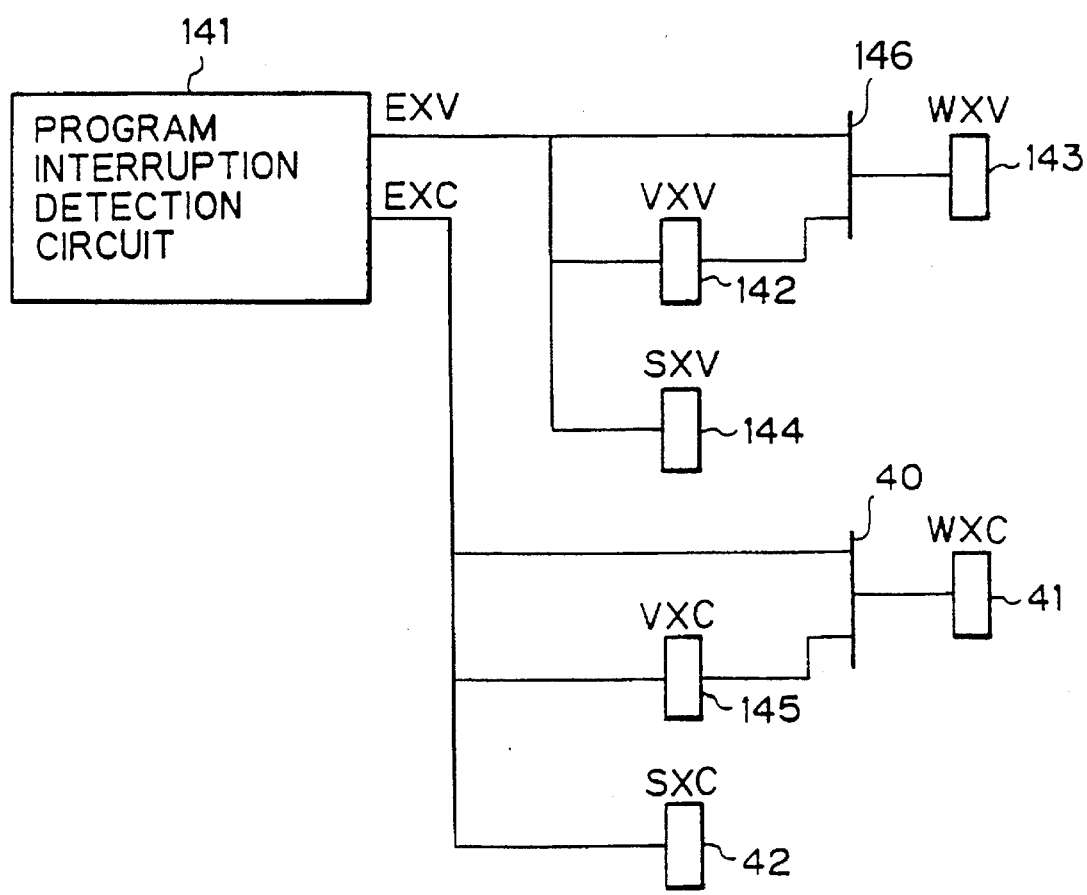
FIG. 14 is a block diagram showing exception code registers used in an embodiment of the present invention.

FIG. 14 is a block diagram showing exception code registers used in an embodiment of the present invention. In the figure, 141 is a program interruption detecting circuit for detecting a program interruption. When the circuit 141 detects a program interruption during the E state of an instruction, it generates an exception valid code EXV and an exception code EXC. The exception valid code XV is a code for representing the presence of the interruption condition. The exception code XC is a code for identify the cause of the interruption. Here, the character, for example E, on the head of each of EXV and EXC means that the interruption is detected during the E state.

When the state of the instruction is changed from the E state to the W state, a selector 146 selects the EXV which is then stored in a WXV register 143 for storing the exception valid code WXV, and a selector 40 selects the EXC which is then stored in a WXV register 41. When the state of the instruction is changed from the E state to the V state, the EXV is shifted through a VXV register 142 and the selector 146 to the WXV register 143, and the EXC is shifted through a VXC register 145 and the selector 40 to the WXC register 41. When the state of the instruction is changed from the E state to the S state, the EXV is stored in a SXV register 144, and the EXC is stored in an SXC register 42.

Figure 15:
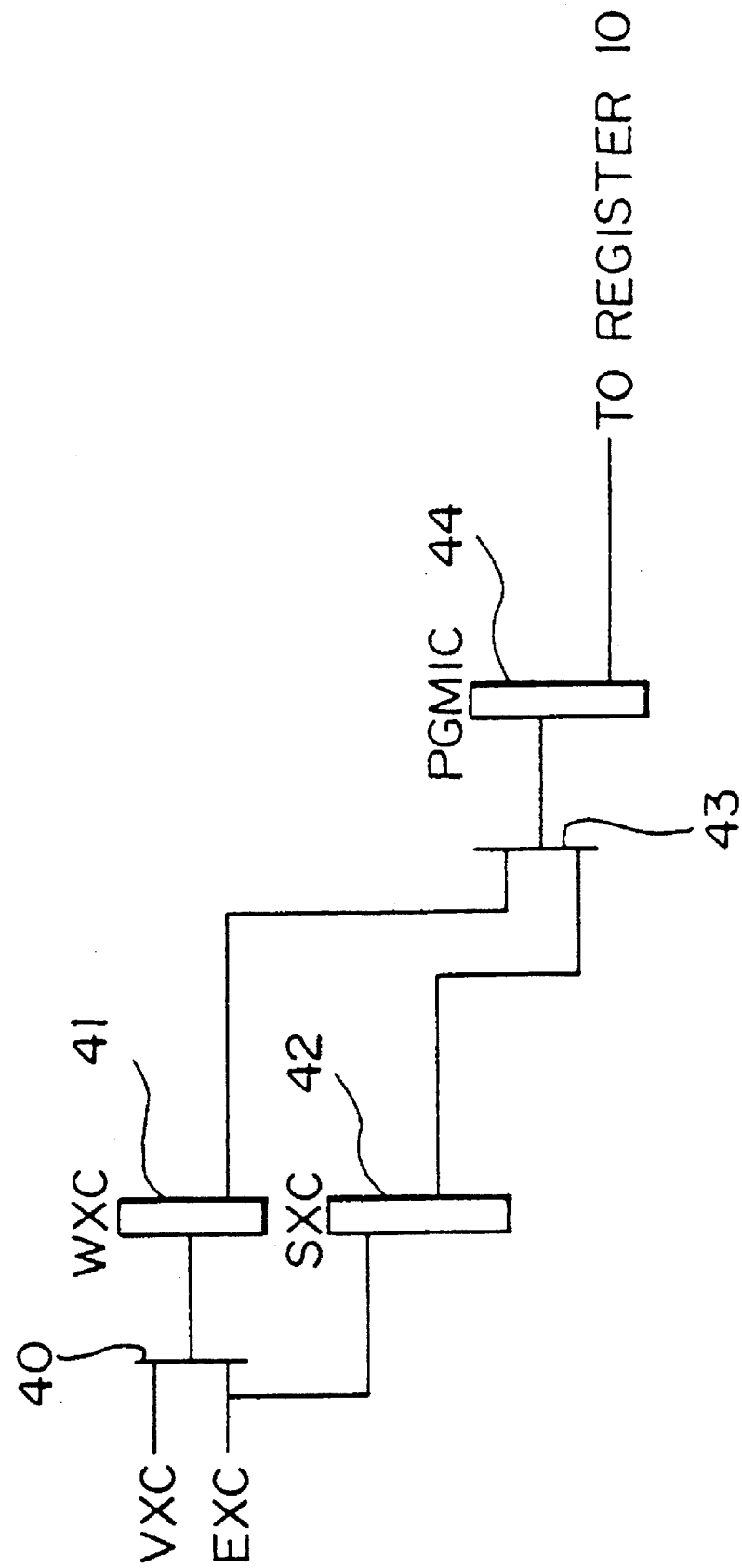
FIG. 15 is a block diagram showing an example of a program interrupt code register updating circuit according to an embodiment of the present invention.

FIG. 15 is a block diagram showing an example of a program interrupt code register updating circuit according to an embodiment of the present invention.

When an interrupt is generated, the cause of the interrupt must also be retained. Similar to the instruction length code ILC, exception code XC is retained as a tag VXC or EXC of the V state instruction or the E state instruction, respectively. One of the VXC and EXC is selected by a selector 40 and is set in a WXC register 41. The EXC is set in the SXC register 42.

The WXC or the SXC is selected by a selector 43, and is set in a program interrupt code register (PGMIC) 44. The PGMIC 44 is stored in a designated main memory area during an interrupt process, executed by hardware (not shown). Here, the selector 43 selects the WXC, when an interrupt condition is present in the W state, and selects the SXC, when the interrupt condition is not present in the W state but is present in the S state to update the PGMIC 44. When both the W and S states do not have any interrupt condition, the PGMIC 44 is not updated.

Figure 16:
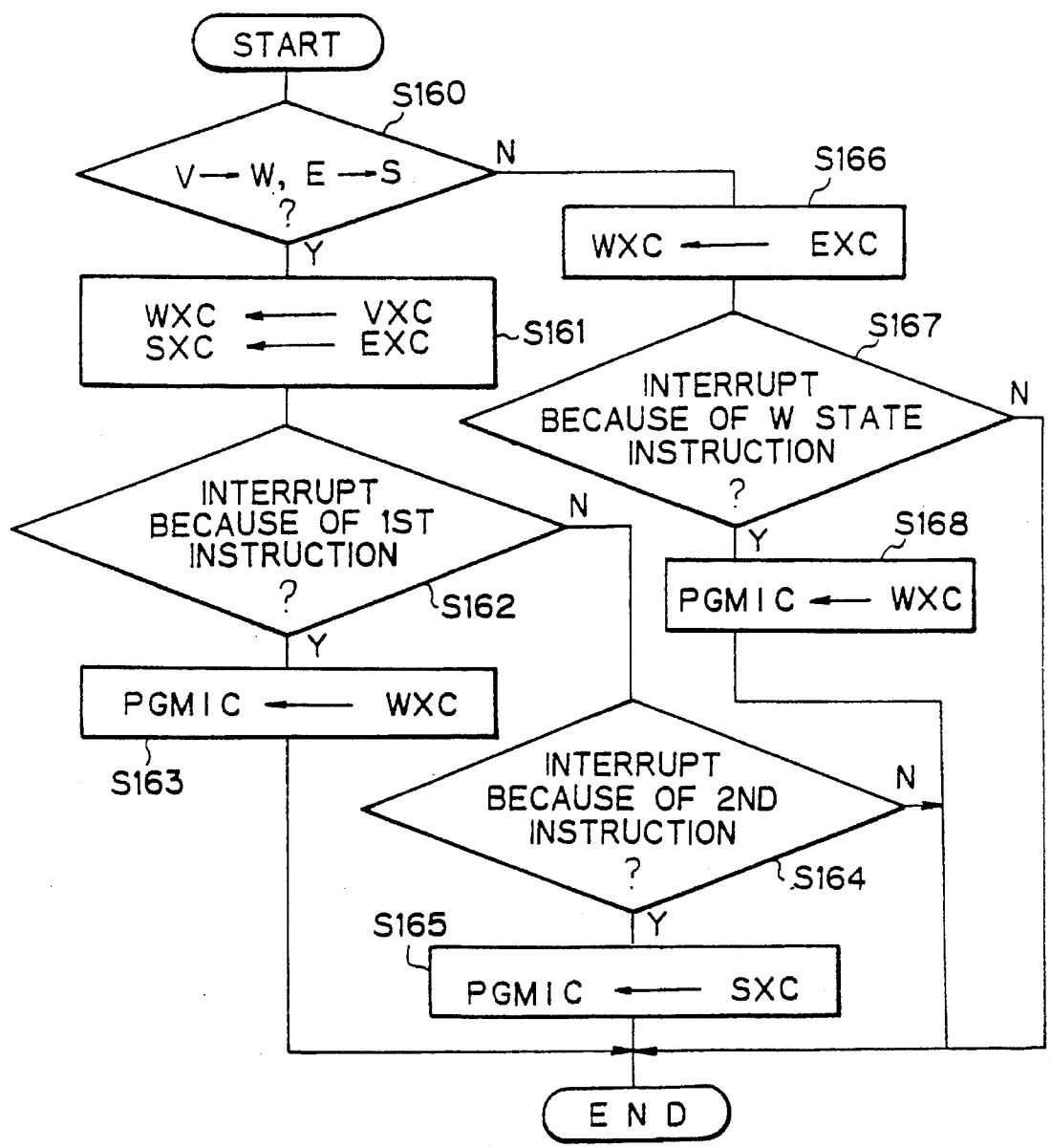
FIG. 16 is a flowchart explaining the operation of a program interrupt code register in the pipeline operation control method according to an embodiment of the present invention.

FIG. 16 is a flowchart explaining the operation of the program interrupt code register shown in FIG. 15 in the pipeline operation control method according to an embodiment of the present invention. In the figure, at step S160, it is determined whether the state of the first instruction changes from the V state to the W state and the state of the second instruction changes from the E state to the S state. If so, at step S161, the selector 40 selects the VXC to be stored in the WXC register 41, and EXC is directly stored in the SXC register 42. Then, at step S162, it is determined whether or not the interruption is because of the first instruction. If so, at step S163, the selector 43 selects the WXC to be stored in the PGMIC 44. At step S162, if the interruption is not caused by the first instruction, then at step S164, it is determined whether or not the second instruction is the cause of the interruption. If so, at step S165, the selector 43 selects the SXC to be stored in the PGMIC 44. At step S166, if the answer is no, then at step S167, it is determined whether or not the interruption is caused by a W state instruction. If so, at step S168, the selector 43 selects the WXC to be stored in the PGMIC 44.

In the above description, the embodiment of the present invention is described in detail by using the store instruction; however, the present invention is not restricted to this. For all cases in which hardware resources do not conflict except for the operation of the PSWIAR and so forth in the W state, the present invention can be applied. As an example of such cases, for example, a combination of a floating point instruction and a condition branching instruction can be considered.

In this case, by shifting the condition branching instruction from the E state to the S state, the condition branching instruction can be finished simultaneously with the preceding instruction as shown in FIG. 5 to improve the performance in the speed of the operation. In this case, the difference from the previously explained store instruction is that, in the S state of the condition branching instruction, whether or not the PSWIAR should be replaced by a target address of a branch which is retained as a pipeline tag is controlled by the exception event of the floating point instruction, and depends on whether or not the condition for branching of the condition branch instruction is established.

As described above in detail, according to the present invention, a pipeline calculation control method and system in which the delays of instructions are eliminated and a high speed operation is realized can be provided by additionally providing a special state that can be set simultaneously with the state of the normal pipeline process, and when an instruction can be shifted to the special state by executing the pipeline finishing processes of two instructions simultaneously.

What is claimed is:

1. A pipeline operation control system executing a plurality of instructions, comprising first and second instructions, by a pipeline process, each of said instructions having an address and a sequence of a plurality of states including a final state and at least one calculating state before the final state, when said first instruction includes at least two calculating states before the final state, a second instruction following said first instruction includes a special state as the final state of said second instruction, said special state does not conflict with the final state of said first instruction and the special state of said second instruction are carried out at the same time, said pipeline operation control system receiving an interrupt and comprising:

a program status word instruction address register storing one of the address of said second instruction after the execution of said second instruction, unless the interrupt is received after the execution of said first instruction, and the address of said first instruction when the interrupt is received after the execution of said first instruction;

a first register storing one of an instruction length code of said first instruction when said first instruction has at least two calculating states immediately before the final state, and an instruction length code of said second instruction when said second instruction does not have said special state;

a second register storing an instruction length of said second instruction only when said second instruction has said special state;

first adding means for adding the contents in said first register and the contents in said second register;

selecting means for selecting one of the output of said first register when said second instruction does not have said special state, and the output of said adding means when said second instruction has said special state; and second adding means for adding the output of said selecting means and the output of said program status word instruction address register.

2. A pipeline operation control system as claimed in claim 1, said selecting means comprising inhibiting means for inhibiting the selection of the output of said adding means when an interrupt is detected in the execution of said first instruction.

3. A pipeline operation control system executing a plurality of instructions, comprising first and second instructions, by a pipeline process, each of said instructions having an address and a sequence of a plurality of states including a final state and at least one calculating state before the final state, when said first instruction includes at least two calculating states before the final state, a second instruction following said first instruction includes a special state as the final state of said second instruction, said special state does not conflict with the final state of said first instruction and the special state of said second instruction are carried out at the same time, said pipeline operation control system receiving an interrupt and comprising:

a program status word instruction address register storing one of the address of said second instruction after the execution of said second instruction, unless the interrupt is received after the execution of said first instruction, and the address of said first instruction when the interrupt is received after the execution of said first instruction;

a program interrupt code register storing a cause of an interrupt;

a first interrupt content storing register registering one of the contents of an interrupt of said first instruction when said first instruction has at least two calculating states immediately before the final state and registering the contents of an interrupt of said second instruction when said second instruction does not have said special state;

a second interrupt content storing register registering the contents of an interrupt of said second instruction only when said second instruction has said special state; and a register output selector selecting one of contents in said first interrupt content storing register and contents in said second interrupt storing register and inputting said one of contents in said first interrupt content storing register and contents in said second interrupt storing register to said program interrupt code register, said register output selector selecting the output of said second interrupt content storing register unless said first interrupt content storing register stores the contents of the interrupt of said second instruction.

\* \* \* \* \*

UNITED STATES PATENT AND TRADEMARK OFFICE
CERTIFICATE OF CORRECTION

PATENT NO. : 5,548,736

DATED : August 20, 1996

INVENTOR(S) : Takeo ASAKAWA et al.

It is certified that error appears in the above-indentified patent and that said Letters Patent is hereby corrected as shown below:

Col. 1, lines 21-22, delete "(i.e., the processing of one instruction)";
   line 22, insert --(i.e., the processing of one instruction)-- after "process";
   line 40, change "inter locked" to --interlocked--.

Col. 5, line 9, delete "even" and insert --be in--;
   line 10, insert --,-- after "code";
   line 40, delete ")";
   line 56, change "interlocks" to --interlock--.

*Col. 6, line 41, change "chache" to --cache--;
   line 56, insert --6.-- after "instruction".

Col. 8, line 13, insert --,-- after "21".

Col. 10, line 60, delete "content";
   line 61, insert --content-- after "W-ILC".

Col. 11, line 39, insert --,-- after "state" (second occurrence).

Signed and Sealed this

Thirty-first Day of December, 1996

Attest:

BRUCE LEHMAN

Attesting Officer   Commissioner of Patents and Trademarks